United States Patent

Ferguson

(10) Patent No.: US 10,193,800 B2
(45) Date of Patent: Jan. 29, 2019

(54) SERVICE LABEL ROUTING IN A NETWORK

(71) Applicant: Level 3 Communications, LLC, Broomfield, CO (US)

(72) Inventor: Francis Ferguson, Aurora, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 122 days.

(21) Appl. No.: 15/079,498

(22) Filed: Mar. 24, 2016

(65) Prior Publication Data

US 2016/0285755 A1    Sep. 29, 2016

Related U.S. Application Data

(60) Provisional application No. 62/138,026, filed on Mar. 25, 2015.

(51) Int. Cl.
| | | |
|---|---|---|
| *H04L 12/723* | (2013.01) | |
| *H04L 12/725* | (2013.01) | |
| *H04L 12/46* | (2006.01) | |

(52) U.S. Cl.
CPC .......... *H04L 45/50* (2013.01); *H04L 12/4633* (2013.01); *H04L 45/306* (2013.01)

(58) Field of Classification Search
CPC ........ H04L 45/50; H04L 45/306; H04L 12/46
See application file for complete search history.

(56) References Cited

U.S. PATENT DOCUMENTS

| | | |
|---|---|---|
| 8,204,973 B2 | 6/2012 | Cuervo et al. |
| 2004/0052256 A1 | 3/2004 | Hameleers et al. |
| 2010/0103837 A1 | 4/2010 | Jungck et al. |
| 2012/0287818 A1 | 11/2012 | Corti et al. |
| 2012/0307830 A1 | 12/2012 | DelRegno et al. |
| 2014/0129722 A1 | 5/2014 | Casey |

OTHER PUBLICATIONS

International Search Report dated Jun. 10, 2016, Int'l Appl. No. PCT/US16/23964, Int'l Filing Date Mar. 24, 2016; 3 pgs.
Written Opinion of the International Searching Authority dated Jun. 10, 2016, Int'l Appl. No. PCT/US16/23964, Int'l Filing Date Mar. 24, 2016; 6 pgs.
International Preliminary Report on Patentability dated Sep. 26, 2017, Int'l Appl. No. PCT/US16/023964, Int'l Filing Date Mar. 24, 2016; 8 pgs.
Extended European Search Report, dated Aug. 22, 2018, Application No. 16769670.7, filed Mar. 24, 2016; 8 pgs.

*Primary Examiner* — Ian N Moore
*Assistant Examiner* — Justin T Van Roie

(57) ABSTRACT

Aspects of the present disclosure involve systems, methods, computer program products, and the like, for implementing and utilizing one or more service labels in a Multiprotocol Label Switching (MPLS) network for delivery service through the network. The general, the service label acts to instantiate a service tunnel between two or more devices of the network, such as between a service or provider edge device and a metro device of the network. The service label is unique and arbitrary label per service to a network device. Once the service tunnel is established between the devices, one or more Internet Protocol (IP) or Ethernet services can be multiplex over the service tunnel to the network device. Also, one or more service labels (tunnels) can be established between any two or more network devices to allow for greater flexibility and scale.

14 Claims, 6 Drawing Sheets

SERVICE LABEL ROUTING IN A NETWORK

RELATED APPLICATIONS

This application claims priority under 35 U.S.C. § 119 from U.S. provisional application No. 62/138,026 entitled "SERVICE LABEL ROUTING IN A NETWORK," filed on Mar. 25, 2015, the entire contents of which are fully incorporated by reference herein for all purposes.

FIELD OF THE DISCLOSURE

Embodiments of the present invention generally relate to systems and methods for implementing a telecommunications network, and more specifically for delivery service over a Multiprotocol Label Switching (MPLS) network through the use of a service label in one or more packets of the MPLS network.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide Internet access to the customers of the network. Such services are typically requested by the customer to be provided by the network.

Providing services to customers typically includes provisioning one or more of the network components along a transmission path through the network to the customer device. For example, in a Multiprotocol Label Switching (MPLS) network, two or more edge devices of the MPLS network may be provisioned to transmit packets related to the requested service. Such provisioning typically requires a level of indirection or abstraction to send the traffic between the devices. For example, for a service edge device to send an Internet Protocol (IP) packet to a metro edge device, service edge may carry out an IP route loop for the destination IP address of the metro edge, identify the IP address of the metro edge at the destination for this network, perform an IP address to MPLS label lookup, and forward the IP packet out the appropriate interface with the corresponding MPLS label for metro edge. However, routing packets in this manner may be inefficient for these types of networks. It is with these and other issues that various aspects of the present disclosure were developed.

SUMMARY

One implementation of the present disclosure may take the form of method for providing services to a customer of a telecommunications network. The method may include the operations of receiving a request from a customer device to add a telecommunication service for a customer and instantiating the telecommunication service on the telecommunications network, wherein instantiating the telecommunication service comprises associating a unique service label identifier to the requested telecommunication service. The method may also include the operations of configuring two or more network components to route information associated with the telecommunication service and routing at least one data packet associated with the telecommunication service on the telecommunications network to the customer based at least the unique service label identifier associated with the data packet. In another implementation, the present disclosure may take the form of a system for managing a telecommunications network comprising a processing device and a computer-readable medium with one or more executable instructions stored thereon that cause the processing device to perform the operations described above.

Another implementation of the present disclosure may take the form of a telecommunications network. The network may include a service edge device in communication with a customer device to receive a request from the customer device to add a telecommunication service for a customer, at least one or more metro edge devices in communication with the service edge device, and a network management computing device comprising a processor. The network management computing device may instantiate the telecommunication service on the service edge device and the at least one or more metro edge devices, wherein instantiating the telecommunication service comprises associating a unique service label identifier to the requested telecommunication service and configure the service edge device and the at least one or more metro edge devices to route information associated with the telecommunication service such that the service edge device and the at least one or more metro edge devices route at least one data packet associated with the telecommunication service on the telecommunications network to the customer based at least the unique service label identifier associated with the data packet.

DETAILED DESCRIPTION

Aspects of the present disclosure involve systems, methods, computer program products, and the like, for implementing and utilizing one or more service labels in a MPLS/Ethernet network for delivery service through the network. In one particular embodiment, the MPLS network is configured to provide several services that may be made available to users of the network, such as Internet service and/or Ethernet service. The general, the service label acts to instantiate a service tunnel between two or more devices of the network, such as between a service or provider edge device and a metro device of the MPLS network. The service label may be utilized to support point-to-point service configurations, multipoint service configurations, and point-to-multipoint service configurations of the MPLS network. Also, the service label may be a unique and arbitrary label per service to a network device. For example, the service label "1000" may equate to a first service type (such as "Internet") and service label "1001" may equate to a second service type (such as Ethernet). Generally, the service label only has significance between the two or more devices that share the service tunnel and may take any form desired by administrators of the network. Once the service tunnel is established between the devices, one or more Internet Protocol (IP) or Ethernet services can be multiplex over the service tunnel to the network devices. Also, one or more service labels (or tunnels) can be established between two or more network devices to allow for greater flexibility and scale of the network.

Figure 1:
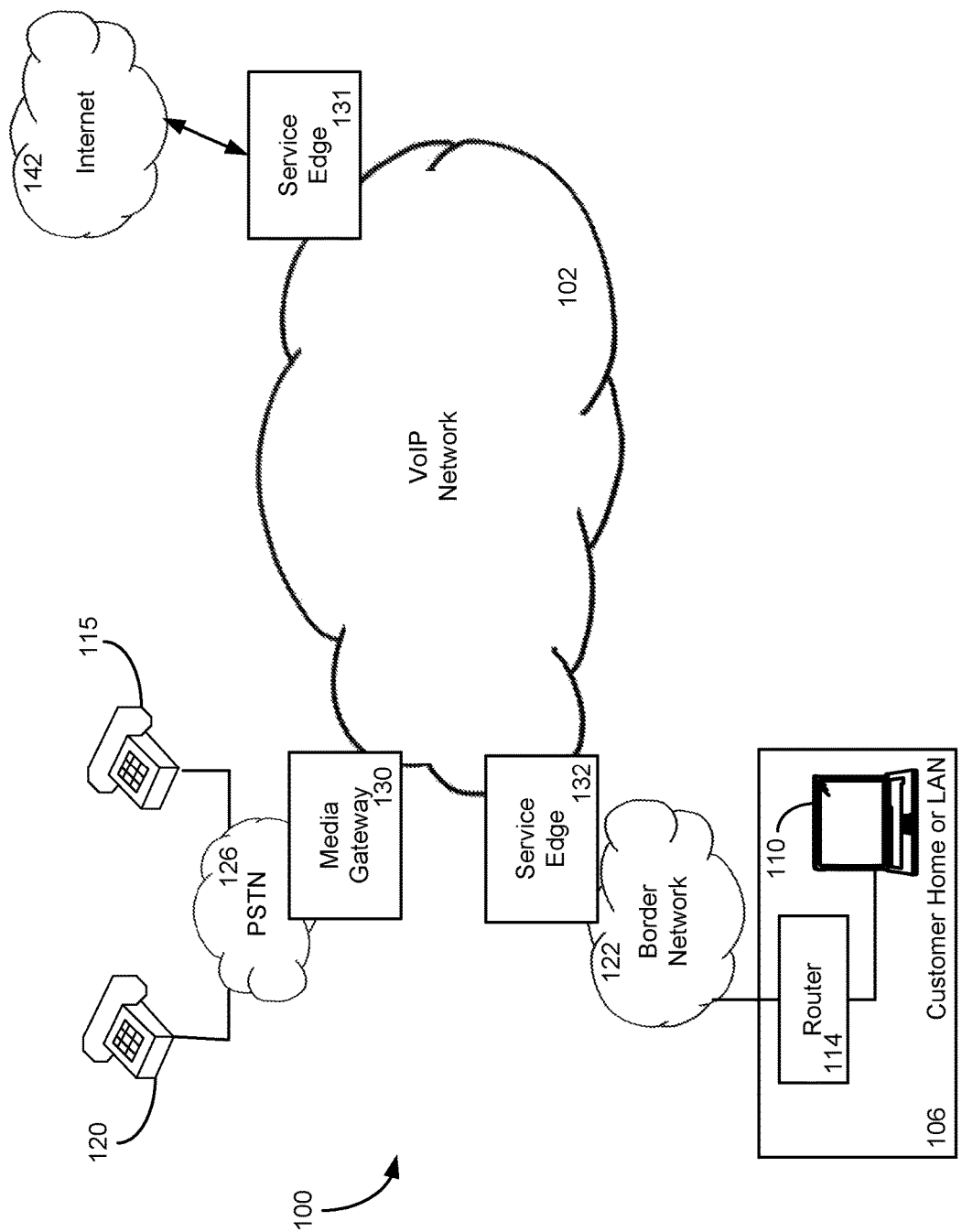
FIG. 1 schematic diagram illustrating an exemplary Voice over Internet Protocol (VoIP) operating environment in accordance with one embodiment.

FIG. 1 illustrates an exemplary operating environment 100 for implementing and utilizing one or more service labels in a MPLS network for delivery service through the network. The environment 100 provides for establishing communication sessions between network users and for providing one or more network services to network users. For example, access to the Internet may be provided to one or more customers of the network through the operating environment 100 discussed herein. With specific reference to FIG. 1, the environment 100 includes a VoIP network 102, which may be provided by a wholesale network service provider. However, while the environment 100 of FIG. 1 shows a configuration using the VoIP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication and/or provides services across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the VoIP network 102.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device 130 or service edge 132. For ease of instruction, only three communication devices 110, 115, 120 are shown communicating with the VoIP network 102; however, numerous such devices, and other devices, may be connected with the network, which is equipped to handle enormous numbers of simultaneous calls and/or other IP-based communications.

Figure 2:
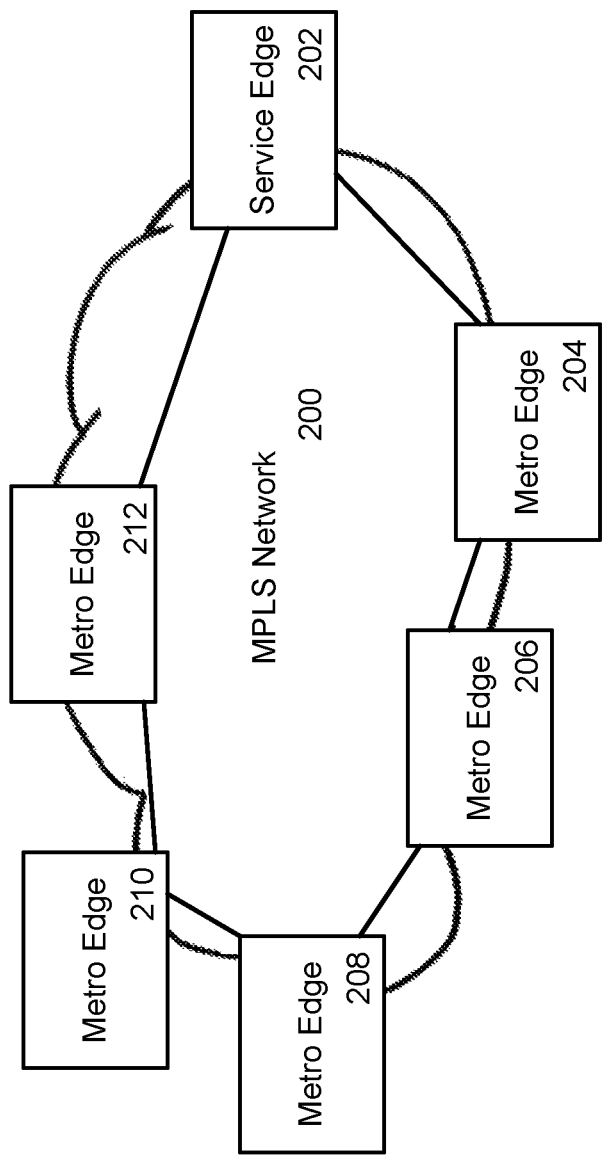
FIG. 2 is a schematic diagram illustrating an exemplary MPLS network in accordance with one embodiment.

In one particular embodiment of the present disclosure, the border network 122 may be a metropolitan area network (MAN) or other type of area network. In general, a MAN is a telecommunications or computer network that includes any number of telecommunication and IP-based devices to provide one or more services to the customers and typically covers an area of the few city blocks to an entire city. However, the border network 122 may include any number of components and be any size to provide services to any number of customers in communication with the border network. FIG. 2 is a schematic diagram illustrating an exemplary MPLS network 200 in accordance with one embodiment. As explained in more detail below, the border network 122 may include one or more portions of the network 200 that utilizes MPLS routing protocol or segment routing to provide data packets to customers in communication with the network.

As illustrated in FIG. 2, the network 200 is an MPLS network. The particular MPLS network 200 illustrated in FIG. 2 includes a service edge device 202 and several metro edge devices 204-212. In a traditional MPLS network, the service edge 202 uses an MPLS label to send traffic to another edge device 204-212 in the network 200. The creation of the MPLS label is carried out through a combination of protocols to create a distribution tree based on the network configuration. The label distribution tree is typically dynamically created on each device, such that the label tree is unique per device. For example, the MPLS label that each device of the network 200 uses to identify another particular device in the network may be unique and can change due to network topology changes.

Creating services such as traditional IPVPN or VPLS services between two or more edge devices of the MPLS network 200 typically requires a level of indirection or abstraction to send the traffic between the devices. For example, for service edge 202 to send an IP packet to metro edge 206, service edge may carry out an IP route loop for the destination IP address of the metro edge 206, identifies the IP address of the metro edge 206 at the destination for this network, performs an IP address to MPLS label lookup, and forwards the IP packet out the appropriate interface with the corresponding MPLS label for metro edge 206. As should be appreciated, routing packets in this manner may be inefficient for these types of networks 200.

One way to improve the routing of packets through the MPLS 200 is through a segment routing scheme. In general, each metro edge device 204-212 or node in an MPLS network 200 utilizing segment routing is given a unique Node Segment Identifier ("Node SID") that identifies each node in the network. This unique Node SID may be utilized by the devices of the network 200 for routing within the segment routing network. For example, metro edge 204 may be assigned a Node SID of "1001" that is unique to that metro edge in the network 200. A segment routing label that includes the unique Node SID of metro edge 204 may be included with data packets intended for the particular metro edge device 204. Thus, the segment routing label has a global significance in the network 200 to identify packets intended for a particular device. Further, intermediate nodes within the network 200 are configured to route the packets to the identified device based on the Node SID. In this manner, packets received at the network 200 intended for a particular device in the network may be routed to the destination device based on the segment routing label.

In addition to segment routing, the MPLS 200 may also include a service routing capability through the use of "service labels". Although described herein as implemented in MPLS networks that utilize segment routing, it should be appreciated that the use of service labels to provide services within the MPLS network does not require segment routing. Rather, service labels may be used in any telecommunications network configuration that supports routing based on labels. For example, service labels may be used in an MPLS/Ethernet type network, such as that shown in FIG. 2.

In a typical MPLS configuration, a customer may be connected or otherwise in communication with metro edge device (such as metro edge 208) of the MPLS network 200. Further, the network 200 may provide a service, such as Internet access, to the customer associated with the metro edge 208. As explained above with relation to FIG. 1, data packets and other communications related to the network 200 may be transmitted through the service edge 202 device that is in communication with a VoIP network 102 or other type of telecommunications network. As such, data packets from and intended for the metro edge 208 to provide the customer with the Internet service are transmitted through the network 200 and the service edge 202 to connect the customer to the Internet. In one particular embodiment of the network 200, the packets to the metro edge 208 may include a Node SID label that identifies the particular metro edge device. For example, the Node SID label may include a Node SID of "1003" associated by the network 200 with the particular metro edge device 208. Further, the metro edge 208 may or may not be directly connected with the service edge 202, depending on configuration of the metro network 200. Thus, packets intended for the metro edge device 208 may be received and routed by one or more intermediary devices to connect the metro edge 208 with the service edge 202 of the MPLS network 200. For example, metro edge 204 and metro edge 206 may receive the packet for metro edge 208. In response, the intermediary devices 204, 206 may analyze the packet, determine the segment label ID included in the packet, and route the packet to the intended metro edge 208 or further down the routing chain to the intended metro edge.

In another embodiment of the MPLS network 200 described above, the components of the network 200 utilize a distribution tree to determine the routing of packets through the network. In one particular example, the components may create the distribution tree by information received through different protocols, namely an interior gateway protocol (IGP) for information about the IP networks in the IGP domain and/or a label distribution protocol (LDP) and a resource reservation protocol (RSVP) to create a label distribution tree based on the network data in the IGP. As mentioned, the label distribution tree may be dynamically created on each device in the MPLS network 200 and is unique to each device. In other words, the MPLS label that each device uses to identify a particular device is unique and can change due to topology or network changes.

Typically, the service edge 202 controls the services provided to customers connected to the network 200. In particular, the service edge 202, in response to a request for a service from a customer to the network, instantiates the service on one or more devices associated with the customer, such as the metro edge 204-212 to which the customer is connected. One method to instantiate the service between the metro edge (such as metro edge 206) and the service edge 202 is to build a targeted LDP session through IP addressing between the devices. In another method, the network 200 (and more particularly, the service edge 202) may associate a virtual local area network (VLAN) designation with the requested service. The VLAN designation may identify the customer and/or metro edge 208 of the network 200 to which the service is provided and the type of service. In this method, each VLAN designation is associated with one particular service provided to one particular customer such that the number of VLAN designations generated by the service edge 202 is the same as the number of services being provided by the service edge to the network 200. The network 200 may then utilize the VLAN designation to identify packets for a particular service and customer and route the packets accordingly. As may be appreciated, use of VLAN designations may become unwieldy and difficult to manage as more and more services are provided through the network 200.

In addition to the methods described above, a third method is now discussed to provide one or more services through an MPLS network 200. In particular, service labels may be generated and utilized by the MPLS network 200 to provide services to customers of the network 200. In general, the service label acts to instantiate a service tunnel between two devices of the network, such as between the service edge 202 and a metro edge 206 of the network 200. In one embodiment, the service label may be a unique and arbitrary label per service provided to a network device. Generally, the service label only has significance between the two devices that share the service tunnel and may take any form desired by administrators of the network. In one example, the end to end service tunnel between the components of the network 200 is uniquely identified by the segment label and the service label. Once the service tunnel is established between the devices, one or more IP or Ethernet services can be multiplexed over the service tunnel to the network devices.

Figure 3:
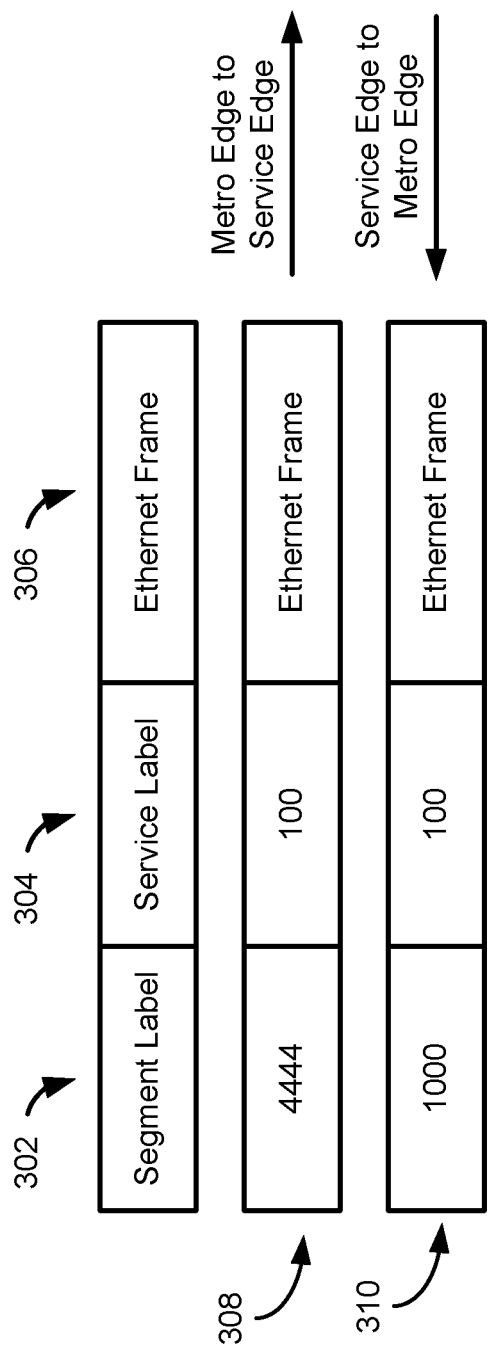
FIG. 3 is an exemplary MPLS network packet including a service label for routing through the MPLS network.

FIG. 3 is an exemplary MPLS network packet including a service label for routing through the MPLS network 200. As shown, a packet may include a segment label 302 portion, a service label 304 portion, and an Ethernet frame portion 306. Although shown as including an Ethernet frame portion 306, it should be appreciated that the packet may include any type of a network packet and is not necessarily Ethernet based. In addition, it is not required that the packet include a segment label 302 portion. Rather, the MPLS network 200 may route using the label distribution tree described above. As discussed, a packet transmitted through the network 200 may include a segment label that identifies the destination device for the packet. For example, the segment label 302 may include an identifier that is associated with a particular device in the network, such as metro edge 206 in the network 200 discussed above. In the packet 308 illustrated in FIG. 3, the segment label 302 includes the identifier "4444". This segment label 302 may correspond to a service edge 202 device of the network 200 and the packet 308 may be routed to the service edge at least based partially on the segment label. As also discussed above, the segment labels may be arbitrary and include any identifier that is transmittable with the packet. In a similar manner, packets from the service edge 202 intended for the metro edge 206 also includes a segment label. For example, packet 310 of FIG. 3 includes a segment label "1000" that may identify the metro edge 206 for the packet.

In addition to including a segment label 302, the packets 308, 310 may include a service label identifier 304. In the particular example shown, the service label identifier is "100". This label is arbitrarily set by the devices exchanging packets and may be in any form that is transmittable with the packet. The service label 304 indicates a service provided to the metro edge 206 through the network 200. For example, the service label 304 may be assigned for any type of service, such as IP, IP virtual private network (IPVPN), Firewall, distributed denial of service (DDOS) protection, etc. Further, because the service label value is arbitrarily assigned, the number of service labels is scalable to match the number of services provided by the network, while also being easier to understand to administrators of the network. Through the use of the service label 304 in the MPLS packet 308, 310, a service tunnel is established between two devices of the network 200, namely the metro edge 206 to which the customer receiving the service is connected and the service edge 202 that connects the MPLS network 200 to a telecommunications network or the Internet. In particular, because the service label value is only used by the devices of the network exchanging packets for a particular service, a service tunnel is created between the devices and the packets may be routed through the service tunnel based on the arbitrarily set service label 304 value.

Figure 4A:
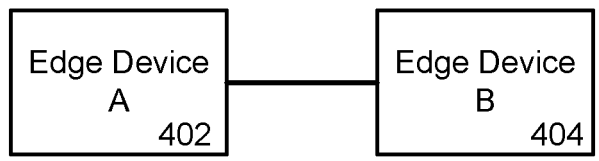
FIGS. 4A-4C are exemplary MPLS network service configurations for use with a service label.
Figure 4B:
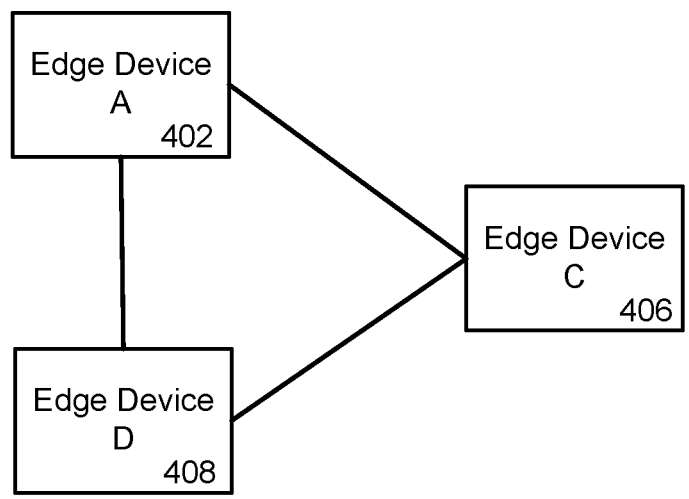
Figure 4C:
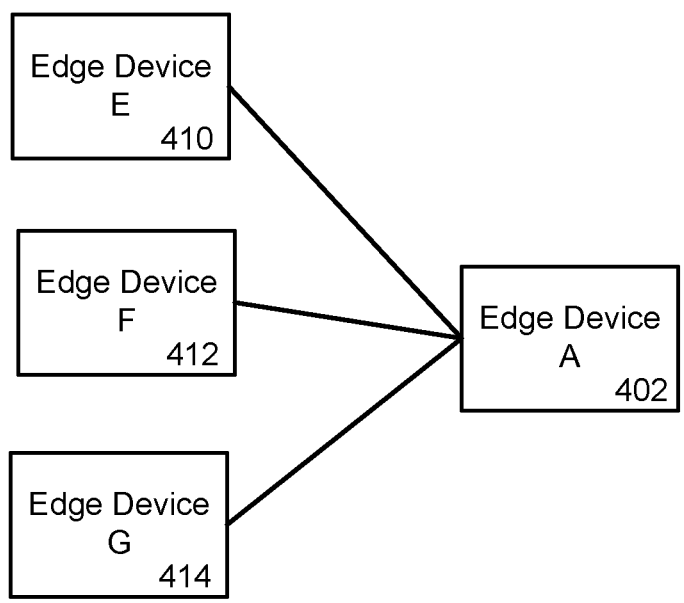

Through the use of the service label, a service is provided to one or more components of an MPLS network 200. In general, each device in the MPLS 200 receiving the service is configured with a service label and a list of a neighboring device or devices such that a service tunnel may be created between two or more devices of the MPLS network. Thus, a service label construct in the MPLS network 200 can support point-to-point services, multipoint service, and/or point-to-multipoint services. FIGS. 4A-4C are exemplary MPLS network service configurations for use with a service label. In particular FIG. 4A illustrates a point-to-point service configuration, FIG. 4B illustrates a multipoint service configuration, and FIG. 4C illustrates a point-to-multipoint service configuration.

The point-to-point configuration provides services between two devices of the MPLS network 200. Thus, the configuration of FIG. 4A provides a point-to-point service tunnel between edge device A 402 and edge device B 404. In one embodiment, the service is instantiated between the devices utilizing a service label. In this particular example, the service label identifier is "4567". Further, edge device A 402 includes a segment label identifier "10009" that is used to identify the connected device (in this case, edge device B 404). Similarly, edge device B 404 includes a segment label identifier "10001" of connected device edge device A 402. For a point-to-point configuration, each edge device 402,404 is configured with a common "service label" and the associated segment label identifier. To utilize the service labels, each device 402,404 is instantiated with the labels indicated in the Table A below.

TABLE A

| Service Label | Device | Node Segment |
| --- | --- | --- |
| 4567 | Edge Device A | 10009 |
| 4567 | Edge Device B | 10001 |

As shown, each device 402,404 in the point-to-point configuration is configured with the service label "4567" and a unique segment label identifier of the connected device in the service tunnel. To instantiate each device with the service label, the Ethernet frame sent from edge device A may be:

|SRC-DST-MAC|10009|4567|payload and the Ethernet frame sent from edge device B may be:

|SRC-DST MAC|10001|4567|payload.

Packets transmitted between edge device A 402 and edge device B 404 may be routed based on the service label "4567" included in the packets. In other words, a service tunnel is created between the devices 402, 404 as packets are routed based on the service label. Further, because the service label value is arbitrarily determined for the particular service tunnel between the devices 402, 404, more efficient transmission of the packets between the devices may occur.

The multipoint configuration of FIG. 4B provides services between three or more devices of the MPLS network. Thus, the configuration of FIG. 4B provides a service tunnel between edge device A 402, edge device C 406, and edge device D 408. In one embodiment, the service is instantiated between the devices utilizing a service label. In this particular example, the service label identifier is "5678". Further, edge device A 402 includes a segment label identifiers "10006" and "10007" of the connected device (in this case, edge device C 406 and edge device D 408). Similarly, edge device C 406 and edge device D 408 includes segment label identifiers of the connected devices in the multipoint configuration. To utilize the service labels, each device of the multipoint configuration is instantiated with the labels indicated in the Table B below.

TABLE B

| Service Label | Device | Node Segment |
| --- | --- | --- |
| 5678 | Edge Device A | 10006 |
|  |  | 10007 |
| 5678 | Edge Device C | 10001 |
|  |  | 10007 |
| 5678 | Edge Device D | 10001 |
|  |  | 10006 |

As shown, each device in the multipoint configuration is configured with the service label "5678" and a unique segment label identifier of the connected devices in the configuration. To instantiate each device with the service label, the Ethernet frame send from edge device A to edge device C may be:

|SRC-DST MAC|10006|5678|payload;

the Ethernet frame send from edge device A to edge device D may be:

|SRC-DST MAC|10007|5678|payload;

the Ethernet frame send from edge device C to edge device A may be:

|SRC-DST MAC|10001|5678|payload;

and the Ethernet frame send from edge device D to edge device C may be:

|SRC-DST MAC|10006|5678|payload.

The point-to-multipoint configuration of FIG. 4C provides services from one device to two or more other devices of the MPLS network. Thus, the configuration of FIG. 4C provides a service tunnel between edge device A 402 to edge device E 410, edge device F 412, and edge device G 414. In one embodiment, the service is instantiated between the devices utilizing a service label. In this particular example, the service label identifier is "6789". Further, edge device A 402 includes a segment label identifiers "10002", "10003", and "10004" of the connected device (in this case, edge device E 410, edge device F 412, and edge device G 414, respectively). Similarly, edge device E 410, edge device F 412, and edge device G 414 includes segment label identifier "10001" of the connected edge device A 402 in the point-to-multipoint configuration. To utilize the service labels, each device of the point-to-multipoint configuration is instantiated with the labels indicated in the Table C below.

TABLE C

| Service Label | Device | Node Segment |
|---|---|---|
| 6789 | Edge Device A | 10002 |
|  |  | 10003 |
|  |  | 10004 |
| 6789 | Edge Device E | 10001 |
| 6789 | Edge Device F | 10001 |
| 6789 | Edge Device G | 10001 |

As shown, each device in the point-to-multipoint configuration is configured with the service label "6789" and a unique segment label identifier of the connected devices in the configuration. To instantiate each device with the service label, the Ethernet frame send from edge device A to edge device E may be:

|SRC-DST MAC|10002|6789|payload;

the Ethernet frame send from edge device A to edge device F may be:

SRC-DST MAC|10003|6789|payload;

the Ethernet frame send from edge device E to edge device F may be:

|SRC-DST MAC|10001|6789|payload;

and the Ethernet frame send from edge device G to edge device A may be:

|SRC-DST MAC|10001|6789|payload.

After instatiation of the network devices as described, packets may be routed through one or more service tunnels created between the devices of the network configuration through point-to-point tunnels, multipoint service tunnels, and/or point-to-multipoint tunnels based on the service label value provided for each tunnel configuration.

Figure 5:
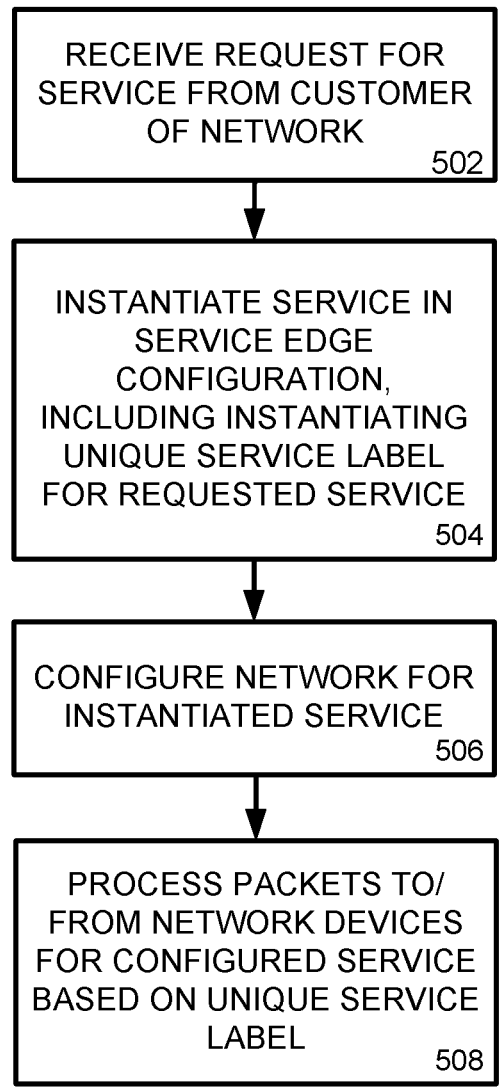
FIG. 5 is a flowchart illustrating a method for provisioning a service in a MPLS network utilizing a service label.

FIG. 5 is a flowchart illustrating a method for provisioning a service in a MPLS network utilizing a service label. The operations of the method of FIG. 5 may be performed by one or more of the components of the MPLS network 200 discussed above. For example, the operations may be performed by the service edge 202 of the network. In addition, the operations may be performed by the components through the execution of one or more software instructions, through one or more hardware circuits, or through a combination of both software and hardware.

Beginning in operation 502, the service edge receives a request for the addition of a service to one of the customers of the network. The requested service may be any service provided by the network, such as IP, Ethernet, IPVPN, Firewall, DDOS protection, and the like. In request may be provided by the network or an administrator to the network to provision the service to the customer. In response to receiving the request, the service edge may instantiate the service in the service edge configuration in operation 504. The instantiating the service may include associating a unique service label with the requested service and with the particular metro edge component associated with the customer. In one embodiment, the service label is associated with the segment routing label of the metro edge device. For example, through the instantiating process outlined in more detail below, a unique server label is created and associated with that particular service request. Thus, a unique service label may be created for providing Internet service between two or more components of the network. Each component involved in providing the service is instantiated with the unique service label such that packets used to provide the service may be routed based on the unique service label. In this manner, the unique service label is utilized to create a service tunnel between the two or more components of the network to streamline and improve the transmission of the service packets through the network.

In operation 506, the network 200 through which the service is requested is configured to provide the requested service. In particular, the components of the network 200 included in providing the service are instantiated to be able to process packets associated with the service. In one particular embodiment, the components are instantiated to process the packets based on the unique service label associated with the requested service. Thus, in operation 508, the configured components process the packets associated with the requested service to and from the components. In particular, the components of the network 200 route one or more of the packets used to provide the requested service based on the unique service label associated with the service. Through this, a service tunnel is created between the components that provide the service of the network 200 based on the service label associated with the provided service.

Several examples of instantiating a service in different service configurations of the MPLS network are described above with reference to FIGS. 4A-4C. Additional examples of instantiating a service label for a requested service on a MPLS network are now described. In the example (and as discussed above), the service edge and the metro edge devices of the network have a unique segment routing label associated with the devices. For example, metro edge A may have segment routing label ID 1000, metro edge B may have segment routing label ID 1001, and so on. In the service edge, interfaces are automatically instantiated based on a "service interface alias" and the service label. In the case for providing Internet service to a customer, the service interface may be int-1000 for metro edge A and int-1001 for metro edge B, and so on. One example set of instructions for instantiating the Internet service with the metro edges of the network is:

set service-label Internet
set service-label Internet interface alias int; Config alias
set service-label Internet label 100; "Service label"
set service-label Internet neighbor Segment-ID 1000; Connect to metro edge A
set service-label Internet neighbor Segment-ID 1001; Connect to metro edge B set service-label Internet neighbor Segment-ID 1002; Connect to metro edge C
set service-label Internet neighbor Segment-ID 1003; Connect to metro edge D
set service-label Internet neighbor Segment-ID 1004; Connect to metro edge E As should be appreciated, the use of ID "100" to identify the Internet service is arbitrarily selected by the service edge or network configuration device. In general, any identifier may be selected and utilized by the network configuration to identify the particular service. For example, the network configuration device may select a first identifier for a first service to a first metro edge and a second identifier for the same service to a second metro edge. In general, any number of service labels may be generated and utilized by the network to configure the services of the network as desired by a network administrator for ease of understanding and scalability of the service labels. Also, the label "Internet" used above may also be any label given to the service. In one example, the label may be based on the customer to which the service is provided by the network.

Upon instantiation of the service at the service edge, the network is further configured to provide the requested service to the particular metro edge or metro edges that are to receive the service in operation 506. For example, the sub-interface stanza may be configured for the services requested and provided by the network. Continuing the example above, the network configuration may execute the following set of instructions to configure the network devices:
set interfaces int-1000 unit 1
set interfaces int-1000 unit 1 family inet address 20.1.1.9/30
set interfaces int-1001 unit 1
set interfaces int-1001 unit 1 family inet address 20.1.1.1/30
set interfaces int-1001 unit 1 vlan-id 333
set interfaces int-1001 unit 2
set interfaces int-1001 unit 2 family inet address 20.1.1.5/30
set interfaces int-1001 unit 2 vlan-tags outer 333
set interfaces int-1001 unit 2 vlan-tags inner 1111
These instructions configure the network to provide Internet service to metro edge A (based at least on the "in-1000" portion of the instruction) and assign IP addresses 20.1.1.9/30 to Internet service provided to metro edge A. Similarly, the instructions configure the network to provide Internet service to metro edge B (based at least on the "in-1001" portion of the instruction) and assign IP addresses 20.1.1.1/30 to the Internet service provided to metro edge B and a VLAN ID of 333. Further, a second unit of metro edge B is assigned IP addresses 20.1.1.5/30. In this manner, the services instantiated above are provided to the metro edges and other network devices utilizing the Node SID and the service label instantiated above.

With the network configured to provide the requested service through the network, the network may receive and process information packets to and from the network in operation 508. In one particular embodiment, the information packets may include the Node SID and service label discussed above for routing of the service packets to the designated network devices. As such, through the operations of the method of FIG. 4, one or more services may be provided to customers of a MPLS network utilizing service labels included in the data packets associated with the service. In this manner, the use of service labels provides the network or network administrator flexibility and scalability to provide any number of services to the components and customers of the network.

Examples of providing other types of services in the MPLS network are now provided. An example of instantiating a service label for an IPVN service includes the instructions of:
set service-label IPVPN
set service-label IPVPN interface alias IPVPN; Config alias
set service-label IPVPN label 101; "Service label"
set service-label IPVPN neighbor Segment-ID 1000; Connect to ME#1
set service-label IPVPN neighbor Segment-ID 1001; Connect to ME#2
set service-label IPVPN neighbor Segment-ID 1002; Connect to ME#3
set service-label IPVPN neighbor Segment-ID 1003; Connect to ME#4
set service-label IPVPN neighbor Segment-ID 1004; Connect to ME#5
set interfaces IPVPN-1001 unit 1 family inet address 30.1.1.1/30
set interfaces IPVPN-1001 unit 1 vlan-id 333
set routing-instances VPN-A instance-type vrf
set routing-instances VPN-A interface IPVPN-1000.1
set interfaces IPVPN-1001 unit 2 family inet address 30.1.1.5/30
set interfaces IPVPN-1001 unit 2 vlan-tags outer 444
set interfaces IPVPN-1001 unit 2 vlan-tags inner 2222
set routing-instances VPN-B instance-type vrf
set routing-instances VPN-B interface IPVPN-1000.2
An example for instantiating a service label for a VPLS service includes the instructions of:
set service-label VPLS
set service-label VPLS interface alias VPLS; Config alias
set service-label VPLS label 103; "Service label"
set service-label VPLS neighbor Segment-ID 1000; Connect to ME#1
set service-label VPLS neighbor Segment-ID 1001; Connect to ME#2
set service-label VPLS neighbor Segment-ID 1002; Connect to ME#3
set service-label VPLS neighbor Segment-ID 1003; Connect to ME#4
set service-label VPLS neighbor Segment-ID 1004; Connect to ME#5
set interfaces VPLS-1000 unit 1
set interfaces VPLS-1000 unit 1 encapsulation vlan-vpls
set interfaces VPLS-1000 unit 1 vlan-id 333
set routing-instances VPN-C instance-type vpls
set routing-instances VPN-C interface VPLS-1000.1
set interfaces VPLS-1001 unit 1
set interfaces VPLS-1001 unit 1 encapsulation vlan-vpls
set interfaces VPLS-1001 unit 1 vlan-tags outer 444
set interfaces VPLS-1001 unit 1 vlan-tags inner 2222
set interfaces VPLS-1001 unit 1 input-vlan-map pop-pop
set interfaces VPLS-1001 unit 1 input-vlan-map push-push
set routing-instances VPN-D instance-type vpls
set routing-instances VPN-D interface VPLS-1001.1

Figure 6:
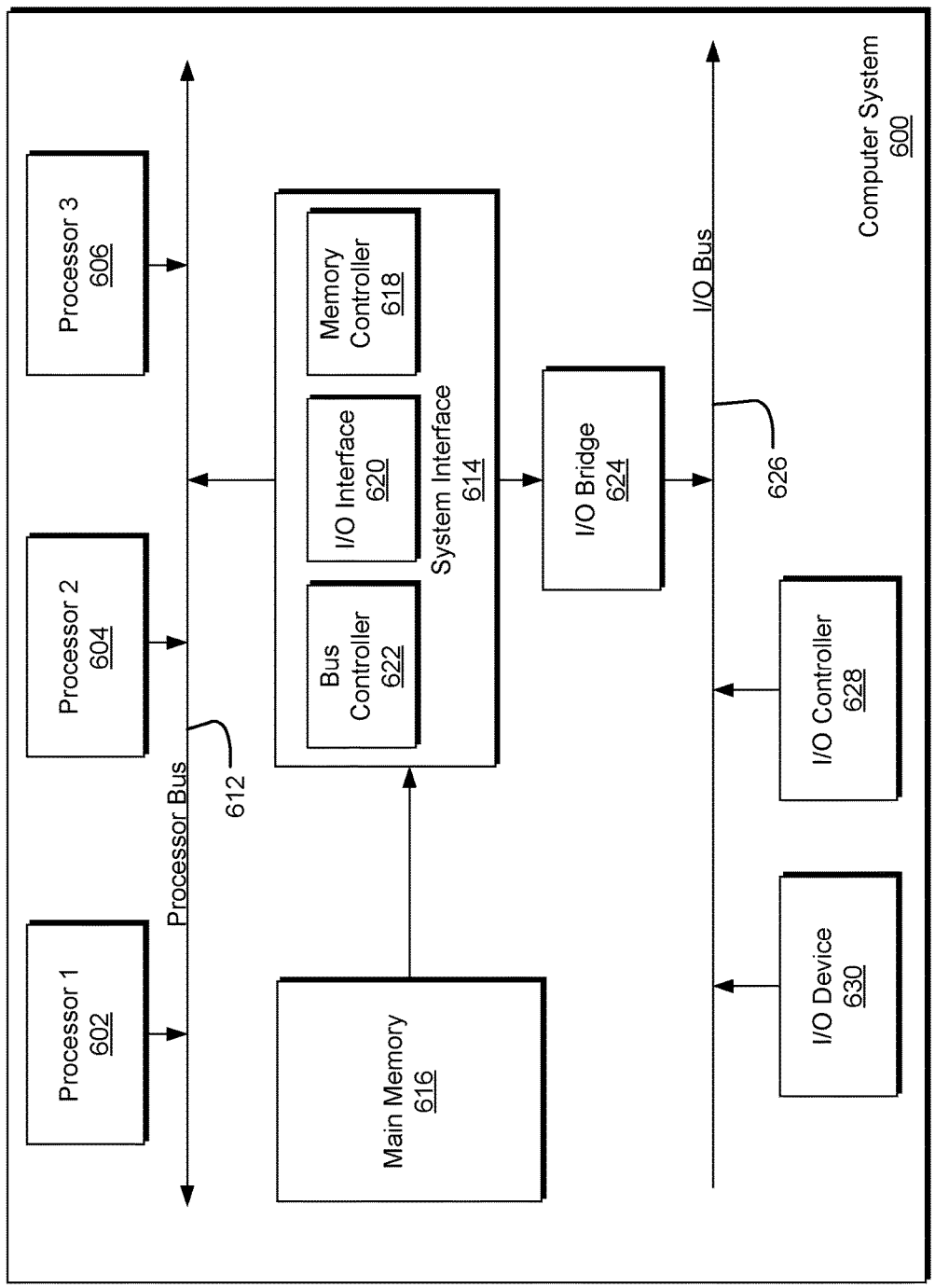
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be the service edge device or metro edge device discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 640, as illustrated.

I/O device 640 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for providing services to a customer of a telecommunications network, the method comprising:
receiving a request from a customer device to add a telecommunication service for the customer, wherein the telecommunication service comprises one of Firewall services or distributed denial of service (DDOS) protection;
instantiating the telecommunication service on the telecommunications network, wherein instantiating the telecommunication service comprises associating a unique service label identifier to the requested telecommunication service, and wherein the telecommunications network is a Multiprotocol Label Switching (MPLS) network;
configuring network components on the telecommunication network to route information associated with the telecommunication service, wherein an intermediate network component of the network components on the telecommunication network is intermediate to two of the network components;
generating a segment label identifier associated with the network components; and
routing at least one data packet associated with the telecommunication service on the telecommunications network to the customer based at least on the unique service label identifier associated with the data packet, wherein the intermediate network component modifies the unique service label identifier based on network changes, the at least one data packet comprising at least one of the unique service label identifier, the segment label identifier, and a frame associated with the instantiated telecommunication service.

2. The method of claim 1 wherein routing the at least one data packet associated with the telecommunication service on the telecommunications network to the customer based at least the unique service label identifier associated with the data packet creates a service tunnel between the network components.

3. The method of claim 1 wherein the network components are connected in a configuration comprising one of a point-to-point service configuration, a multipoint service configuration, or a point-to-multipoint service configuration.

4. The method of claim 1 wherein the telecommunication service comprises one of Internet service or Internet Protocol virtual private network (IPVPN).

5. The method of claim 1 wherein the network components comprise a service edge telecommunications device and a metro edge telecommunications device.

6. A telecommunications network, comprising:
a service edge device in communication with a customer device to receive a request from the customer device to add a telecommunication service for a customer, wherein the telecommunication service comprises one of Firewall services or distributed denial of service (DDOS) protection;
metro edge devices in communication with the service edge device wherein an intermediate metro edge device of the metro edge devices on the telecommunication network is intermediate to two of the metro edge devices; and
a network management computing device comprising a processor configured to:
instantiate the telecommunication service on the service edge device and the metro edge devices, wherein instantiating the telecommunication service comprises associating a unique service label identifier to the requested telecommunication service; and
configure the service edge device and the metro edge devices to route information associated with the telecommunication service;
generate a segment label identifier associated with the service edge device and the metro edge devices;
wherein the service edge device and the metro edge devices route at least one data packet associated with the telecommunication service on the telecommunications network to the customer based at least on the unique service label identifier associated with the data packet, the at least one data packet comprising at least one of the unique service label identifier, the segment label identifier, and a frame associated with the instantiated telecommunication service;
wherein the intermediate metro edge device modifies the unique service label identifier based on network changes, and
wherein the service edge device and the metro edge devices comprise at least a portion of a Multiprotocol Label Switching (MPLS) network.

7. The telecommunications network of claim 6 wherein routing the at least one data packet associated with the telecommunication service on the telecommunications network to the customer based at least on the unique service label identifier associated with the data packet creates a service tunnel between the service edge device and the at least one or more metro edge devices.

8. The telecommunications network of claim 6 wherein the service edge device and the at least one or more metro edge devices are connected in configuration comprising one of a point-to-point service configuration, a multipoint service configuration, or a point-to-multipoint service configuration.

9. The telecommunications network of claim 6 wherein the telecommunication service comprises one of Internet service or Internet Protocol virtual private network (IP-VPN).

10. A system for managing a telecommunications network, the system comprising:
a processing device; and
a computer-readable medium with one or more executable instructions stored thereon, wherein the processing device executes the one or more instructions to cause the processing device to:
receive a request from a customer device to add a telecommunication service for a customer, wherein the telecommunication service comprises one of Firewall services or distributed denial of service (DDOS) protection;
instantiate the telecommunication service on the telecommunications network, wherein the telecommunication service is instantiated such that a unique service label identifier is associated with the requested telecommunication service, and wherein the telecommunications network is a Multiprotocol Label Switching (MPLS) network;
configure network components on the telecommunication network to route information associated with the telecommunication service, wherein an intermediate network component of the network components on the telecommunication network is intermediate to two of the network components;
generate a segment label identifier associated with the network components; and
route at least one data packet associated with the telecommunication service on the telecommunications network to the customer based at least on the unique service label identifier associated with the data packet, wherein the intermediate network component modifies the unique service label identifier based on network changes, the at least one data packet comprising at least one of the unique service label identifier, the segment label identifier, and a frame associated with the instantiated telecommunication service.

11. The system of claim 10 wherein the at least one data packet associated with the telecommunication service on the telecommunications network is routed to the customer based on at least the unique service label identifier associated with the data packet that creates a service tunnel between the network components.

12. The system of claim 10 wherein the network components are connected in a configuration comprising one of a point-to-point service configuration, a multipoint service configuration, or a point-to-multipoint service configuration.

13. The system of claim 10 wherein the telecommunication service comprises one of Internet service or Internet Protocol virtual private network (IPVPN).

14. The system of claim 10 wherein the network components comprise a service edge telecommunications device and a metro edge telecommunications device.

* * * * *